US012454213B2

(12) United States Patent
Bauer et al.

(10) Patent No.: US 12,454,213 B2
(45) Date of Patent: Oct. 28, 2025

(54) LIGHTING DEVICE FOR A MOTOR VEHICLE

(71) Applicant: Bayerische Motoren Werke Aktiengesellschaft, Munich (DE)

(72) Inventors: Markus Bauer, Munich (DE); Robert Isele, Fuerstenfeldbruck (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 932 days.

(21) Appl. No.: 17/413,660

(22) PCT Filed: Jan. 21, 2020

(86) PCT No.: PCT/EP2020/051383
§ 371 (c)(1),
(2) Date: Jun. 14, 2021

(87) PCT Pub. No.: WO2020/156883
PCT Pub. Date: Aug. 6, 2020

(65) Prior Publication Data
US 2022/0055530 A1    Feb. 24, 2022

(30) Foreign Application Priority Data
Jan. 29, 2019  (DE) .................... 10 2019 102 124.3

(51) Int. Cl.
B60Q 1/32       (2006.01)
B60Q 3/80       (2017.01)
(Continued)

(52) U.S. Cl.
CPC ................ B60Q 1/32 (2013.01); B60Q 3/80 (2017.02); H05B 45/10 (2020.01); H05B 45/20 (2020.01);
(Continued)

(58) Field of Classification Search
None
See application file for complete search history.

(56) References Cited

U.S. PATENT DOCUMENTS 3,454,757 A * 7/1969 Bell .......................... B60Q 1/32
                                                                362/540
3,692,998 A * 9/1972 Adams ................ B60Q 1/2615
                                                                362/540
(Continued)

FOREIGN PATENT DOCUMENTS

DE    10 2011 013 777 A1    11/2011
DE    10 2016 007 477 A1    2/2017
(Continued)

OTHER PUBLICATIONS

Web publication Simon Inns Controlling LED brightness using PWM Apr. 15, 2010.*
(Continued)

Primary Examiner — Srinivas Sathiraju
(74) Attorney, Agent, or Firm — Crowell & Moring LLP

(57) ABSTRACT

A lighting device for a motor vehicle including a processing module which is configured to receive and process signals of a data bus of the motor vehicle and send a data signal. The lighting device also includes an LED unit configured to emit light, when operational, with an adjustable brightness and a predefined color location. The LED unit has a microcontroller and a plurality of LEDs, and the microcontroller and the plurality of LEDs are surrounded by a housing of the LED unit. Furthermore, the processing module is configured to convert the data signal, which contains control information for the LED unit, into a pulse width-modulated signal of the current supplied to the individual LEDs and to verify whether the pulse width-modulated signal contains information corresponding to the control information for the LED unit.

14 Claims, 5 Drawing Sheets

(51) Int. Cl.
*H05B 45/10* (2020.01)
*H05B 45/20* (2020.01)
*H05B 45/325* (2020.01)
*H05B 47/23* (2020.01)

(52) U.S. Cl.
CPC ......... *H05B 45/325* (2020.01); *H05B 47/235* (2020.01)

(56) References Cited

U.S. PATENT DOCUMENTS

| | | | | |
|---|---|---|---|---|
| 6,152,590 A * | 11/2000 | Furst | ..................... | F21S 43/14 362/546 |
| 6,347,880 B1 * | 2/2002 | Furst | ..................... | B60Q 1/2696 362/545 |
| 6,616,313 B2 * | 9/2003 | Furst | ..................... | B60Q 3/267 362/546 |
| 7,083,312 B2 * | 8/2006 | Pastrick | ..................... | B60Q 1/2665 359/872 |
| 7,128,449 B2 * | 10/2006 | Golle | ..................... | G09F 13/22 362/84 |
| 7,316,491 B2 * | 1/2008 | Golle | ..................... | B60Q 1/32 362/84 |
| 7,520,645 B2 * | 4/2009 | Ishida | ..................... | F21S 41/285 362/540 |
| 7,525,254 B2 * | 4/2009 | Lys | ..................... | H05B 45/28 315/77 |
| 7,658,524 B2 * | 2/2010 | Johnson | ..................... | B60Q 1/32 362/540 |
| 7,665,870 B2 * | 2/2010 | Golle | ..................... | B60Q 1/503 362/540 |
| 7,922,369 B2 * | 4/2011 | Condon | ..................... | F21V 5/04 362/336 |
| 8,140,344 B2 * | 3/2012 | Kameyama | ..................... | B60Q 1/143 382/104 |
| 8,297,791 B2 * | 10/2012 | Kuang | ..................... | H05B 45/48 362/249.02 |
| 8,400,061 B2 * | 3/2013 | Kuang | ..................... | H05B 47/11 315/77 |
| 8,786,191 B2 * | 7/2014 | Kuang | ..................... | H05B 45/56 315/77 |
| 9,096,168 B2 * | 8/2015 | Kuang | ..................... | B60Q 3/47 |
| 9,102,266 B2 * | 8/2015 | Dingman | ..................... | E05B 17/10 |
| 9,598,003 B2 * | 3/2017 | Dingman | ..................... | E05B 85/16 |
| 10,165,641 B2 * | 12/2018 | Godbillon | ..................... | F21S 41/19 |
| 10,351,052 B2 * | 7/2019 | Dingman | ..................... | B60R 16/0207 |
| 11,672,067 B2 * | 6/2023 | Kuter-Arnebeck | ..................... | F21V 23/0492 315/149 |
| 11,737,181 B2 * | 8/2023 | Kim | ..................... | H05B 45/14 315/32 |
| 11,782,206 B2 * | 10/2023 | Chin | ..................... | G02B 6/009 362/611 |
| 11,837,179 B2 * | 12/2023 | Sakariya | ..................... | H01L 25/0753 |
| 11,920,758 B2 * | 3/2024 | Monpremier | ..................... | F21V 29/90 |
| 2004/0080956 A1 * | 4/2004 | Golle | ..................... | G09F 19/22 362/487 |
| 2004/0080959 A1 * | 4/2004 | Golle | ..................... | B60Q 1/2661 362/540 |
| 2004/0104815 A1 * | 6/2004 | Suyama | ..................... | B60Q 1/509 340/426.16 |
| 2004/0130903 A1 * | 7/2004 | Chen | ..................... | B60Q 1/302 362/487 |
| 2005/0063194 A1 * | 3/2005 | Lys | ..................... | H05B 45/22 362/489 |
| 2005/0207176 A1 * | 9/2005 | Johnson | ..................... | B60Q 1/2696 362/545 |
| 2006/0235753 A1 * | 10/2006 | Kameyama | ..................... | G06Q 30/0201 705/15 |
| 2007/0053172 A1 * | 3/2007 | Golle | ..................... | B60Q 1/543 340/464 |
| 2007/0097700 A1 * | 5/2007 | Pederson | ..................... | F21S 43/31 362/555 |
| 2008/0123356 A1 * | 5/2008 | Golle | ..................... | B60Q 1/2661 362/84 |
| 2009/0021955 A1 * | 1/2009 | Kuang | ..................... | H05B 45/395 362/478 |
| 2010/0219758 A1 * | 9/2010 | Melzner | ..................... | F21V 23/005 315/312 |
| 2011/0309746 A1 * | 12/2011 | Eckel | ..................... | H05B 47/198 315/297 |
| 2012/0127719 A1 * | 5/2012 | Kuang | ..................... | H05B 45/48 362/249.02 |
| 2013/0264942 A1 * | 10/2013 | Kuang | ..................... | H05B 45/12 315/77 |
| 2014/0055030 A1 * | 2/2014 | Kuang | ..................... | H05B 45/56 315/77 |
| 2015/0158421 A1 * | 6/2015 | Kuang | ..................... | B60Q 3/47 315/77 |
| 2016/0185288 A1 * | 6/2016 | Kuang | ..................... | H05B 45/48 315/77 |
| 2017/0050560 A1 * | 2/2017 | Kuang | ..................... | H05B 45/56 |
| 2018/0092180 A1 * | 3/2018 | Godbillon | ..................... | H05K 1/189 |
| 2018/0105099 A1 * | 4/2018 | Weber | ..................... | B60Q 1/2661 |
| 2018/0222383 A1 | 8/2018 | Mueller et al. | | |
| 2019/0135173 A1 | 5/2019 | Bauer et al. | | |
| 2019/0261483 A1 | 8/2019 | Altinger et al. | | |
| 2019/0389372 A1 | 12/2019 | Faivre et al. | | |
| 2022/0055530 A1 * | 2/2022 | Bauer | ..................... | B60Q 3/80 |
| 2022/0289104 A1 * | 9/2022 | Koehne | ..................... | G02B 6/001 |

FOREIGN PATENT DOCUMENTS

| | | |
|---|---|---|
| DE | 10 2015 118 497 A1 | 5/2017 |
| DE | 10 2016 207 723 A1 | 11/2017 |
| DE | 10 2016 207 734 A1 | 11/2017 |
| DE | 10 2016 211 737 A1 | 1/2018 |
| DE | 10 2016 221 772 A1 | 5/2018 |
| FR | 3 062 096 A1 | 7/2018 |
| WO | WO 2017/071972 A1 | 5/2017 |

OTHER PUBLICATIONS

International Search Report (PCT/ISA/210) issued in PCT Application No. PCT/EP2020/051383 dated Mar. 18, 2020 with English translation (six (6) pages).

German-language Written Opinion (PCT/ISA/237) issued in PCT Application No. PCT/EP2020/051383 dated Mar. 18, 2020 (seven (7) pages).

German-language Search Report issued in German Application No. 10 2019 102 124.3 dated Sep. 26, 2019 with a partial English translation (15 pages).

Isele Robert et al. "Automotive interior illumination: challenges and requirements" Proceedings of SPIE; US, vol. 10693, May 28, 2018, pp. 106930U-106930U.

* cited by examiner

LIGHTING DEVICE FOR A MOTOR VEHICLE

BACKGROUND AND SUMMARY OF THE INVENTION

The invention relates to a lighting device and a lighting system for a motor vehicle, which enable a reliable and safe operation of the lighting device.

Lighting devices in motor vehicles using multicolor LED units (LED="light-emitting diode") are known from the related art. Such LED units generally comprise multiple monochromatic LEDs and are typically activated using LED drivers to vary a desired brightness and color coordinates (i.e., a mixed color). For this purpose, a module having a microcontroller is used which, on the one hand, takes over a communication with a motor vehicle data bus and, on the other hand, drives the LED units, typically via PWM outputs (PWM="pulse width modulation"). The so-called LIN bus (LIN="local interconnect network") is frequently used here as the motor vehicle data bus.

Some multicolor LED units have an integrated circuit which is housed together with the monochromatic LEDs, which are controlled via a data stream, in a housing. Parameterizations, which are required in lighting devices having multicolor LED units for operating the individual LED units, are stored in a central processing module.

DE 10 2016 221 772 A2 discloses a lighting device for a motor vehicle having a processing module which is designed to receive, process, and transmit signals from a data bus of the motor vehicle. The lighting device furthermore comprises an LED unit, which is designed to emit light having adjustable brightness and predetermined color coordinates in an operational state, wherein the LED unit has a microcontroller and a plurality of LEDs, and wherein the microcontroller and the LEDs are enclosed by a housing of the LED unit. The LED unit is furthermore designed to communicate bidirectionally with the processing module, so that a current status value of the LED unit is ascertainable by using the LED unit and the processing module, which is representative of a functionality of the LED unit. Due to the structure of the lighting device and the bidirectional communication capability of a respective LED unit, data of a respective LED unit can be collected at any time, which can contribute to keeping as specified or improving the so-called ASIL standard (ASIL="automotive safety integrity level"). This is intended to ensure a specified basic safety level. In this way, for example, a reliability of an LED can be monitored which, for controlled and secure operation of the motor vehicle, reliably has to give information as to whether a certain function is configured or not, for example.

The LED units which are presently available have not been developed according to a safety level corresponding to ISO 26262 and generally only have a qualification of a quality management process, i.e., they only have a so-called QM level. The use in safety-relevant functions, for example autonomous driving functions of the motor vehicle, is therefore not possible without further measures. The microcontrollers of the LED units are generally designed as ASICs (application specific integrated chip), in which the function logic is implemented by an integrated circuit and is no longer changeable. ASIC-based LED units for safety-critical lighting scenarios (steering wheel rim lighting) which only have a QM level can only achieve a required ASIL standard in that the LED unit is not considered to be a safety element outside of a function context (SEooC=safety element out of context), but out of the specific function context. This means that a ASIL standard can only be achieved by a statistical integrity proof, in that a low failure rate of random faults which result in a malfunction, (for example the display of an incorrect color, whereby a safety goal is infringed) can be proven. However, there is a certain remaining risk with this procedure, since random hardware faults which occur in mass production are not known. For use in safety-relevant functions, for example visualizing an autonomous driving function of the motor vehicle by using a lighting device having LED units, is not acceptable.

It is the object of the invention to provide a lighting device and a lighting system for a motor vehicle which can contribute to more reliable operation of the lighting device.

The object is achieved by the features of the claimed invention.

According to a first aspect of the invention, a lighting device for a motor vehicle comprises a processing module which is designed to receive and process signals from a data bus of the motor vehicle and to transmit a data signal. The lighting device furthermore comprises an LED unit which is designed to emit light having adjustable brightness and specified color coordinates in an operational state, wherein the LED unit has a microcontroller and a plurality of LEDs and wherein the microcontroller and the LEDs are enclosed by a housing of the LED unit. The processing module is furthermore designed to convert the data signal which comprises an item of activation information for the LED unit into a pulse-width-modulated signal of the current supplied to the individual LEDs and to check whether the pulse-width-modulated signal contains an item of information which corresponds to the activation information for the LED unit.

The LED unit is implemented by a semiconductor component which emits light of a specified color in emitting operation when electric voltage or current is applied. The LED unit can be provided as a system-in-package (SiP), which comprises the microcontroller and the plurality of LEDs. The housing therefore does not have to be a real housing.

A space-saving lighting function can be implemented by the described lighting device, for example, to light a section in or on a motor vehicle, and the described structure additionally enables hardware faults with respect to a fault of the outgoing communication and the downstream communication components to be checked, so that the LED unit can be monitored with respect to its functionality.

The check as to whether the pulse-width-modulated signal generated by the microcontroller contains an item of information which corresponds to the activation information for the LED unit takes place in that the activation information which is contained in the data signal transmitted by the processing module is compared to the information contained in the pulse-width-modulated signal. If the activation information and the information contained in the pulse-width-modulated signal correspond, the generation and the conversion of the activation information were thus successful, whereby it is ensured that a signal generating and signal converter unit of the processing module operates correctly. If the activation information and the information contained in the pulse-width-modulated signal do not correspond, in contrast, a fault of the signal converter unit of the processing module thus exists.

The microcontroller of the processing module is expediently used as the signal converter, the structure of which corresponds to the microcontroller of the LED unit. In this way, the signal conversion can be provided in a cost-effective and simple manner, since an ASIC can be used which is already used for the LED unit.

The LED unit is expediently designed to convert the received activation information into a pulse-width-modulated signal of the current supplied to the individual LEDs and to supply the pulse-width-modulated signal to the processing module to check whether the pulse-width-modulated signal generated by the LED unit contains an item of information which corresponds to the activation information. The conversion of the activation information into the pulse-width-modulated signal is carried out in a known manner by the microcontroller of the LED unit to set the plurality of LEDs to a brightness contained in the activation information and the specified color coordinates. The pulse-width-modulated signal is then returned to the processing module for evaluation. This expedient embodiment enables, in addition to the check of the functionality of the processing module, an additional check of the functionality of at least one of the communication components of the LED unit in the communication chain by the processing module.

To be able to evaluate the pulse-width-modulated signal generated by the LED unit of the current supplied to the individual LEDs, the current supplied to the individual LEDs is supplied via respective connecting lines to the processing module. The connecting lines are connected on the side of the processing module to the microcontroller, so that it can carry out the desired comparison. On the side of the LED unit, the connecting lines are coupled to respective node points between the LEDs and the microcontroller of the LED unit.

The lighting device comprises in one expedient embodiment, as already described, a plurality of LED units which are coupled via an internal data bus in a series circuit, in particular according to the daisy chain principle, wherein precisely one of the LED units of the series circuit is designed to convert the received activation information into a pulse-width-modulated signal of the current supplied to the individual LEDs and to supply the pulse-width-modulated signal to the processing module for checking.

The conversion of the activation information into the pulse-width-modulated signal and the supply of the pulse-width-modulated signal to the processing module can be carried out by the LED unit coupled directly to the processing module. The activation information can also be received from another LED unit of the plurality of LED units which has received the activation information itself either from the processing module or still another LED unit. The described conversion and supply of the pulse-width-modulated signal to the processing module is carried out in this case by an arbitrary LED unit of a plurality of LED units of the lighting device. In this way, the functionality of the communication components of the LED units included in the communication chain can be checked.

It is obvious for a person skilled in the art from the above description that the supply of the pulse-width-modulated signal from one of the LED units to the processing module requires the presence of respective connecting lines between the processing module and the lines, via which current is supplied to the individual LEDs.

To be able to check all LED units of the series circuit of LED units in the communication chain with respect to the functionality of their communication capability, it is expedient if the LED unit of the series circuit which has the greatest distance from the processing module is designed to convert the received activation information into a pulse-width-modulated signal of the current supplied to the individual LEDs and to supply the pulse-width-modulated signal to the processing module to be checked. The LED unit of the series circuit which has the greatest distance to the processing module represents a so-called last LED unit. In other words, respective connecting lines are provided between the processing module and the lines, via which current is supplied to the individual LEDs of the last LED unit.

The LED unit is furthermore designed in one expedient embodiment to communicate bidirectionally with the processing module, so that a present status value of the LED unit is ascertainable by using the LED unit and the processing module, which is representative of a functionality of the LED unit. The LED unit can then be used due to the described structure and the communication capability to provide items of information with respect to a status, in that the LED unit progressively, at predetermined time intervals, or upon request on the part of the processing module transmits status signals thereto, which are representative of a functionality. For example, such status signals comprise data about a current/voltage characteristic curve or a number of operating hours, so that inferences are possible about a lifetime. The lighting device having LED unit then enables present operating data to be read out so that a contribution for a reliable and controlled operation is provided.

For example, as a result of a retrieved or ascertained voltage characteristic curve from which it may be inferred that a brightness of the checked LED falls below a specified threshold value, energizing of this LED can be increased to increase the brightness of this LED into a specified tolerance range. In addition, for example, due to an ascertained operating duration of an LED, which in the near future will exceed a predicted lifetime of this LED, an item of information can be output which informs about this state of the LED or the associated LED unit and recommends a replacement of this LED.

Because of the described structure of the lighting device, hardware faults in the communication components of the processing module and the LED unit(s) can be recognized. It is thus possible to maintain a specified ASIL standard (ASIL="automotive safety integrity level"), whereby the lighting device can also be used in safety-critical automotive applications. Due to the optional bidirectional communication capability of a respective LED unit, data of a respective LED unit can be collected at any time. It is thus possible to maintain or improve a higher ASIL standard.

The ASIL standard is intended to ensure a specified basic safety level. In this way, for example, a reliability of an LED which indicates the status of an autonomous driving function of the vehicle can be monitored on an instrument cluster or an operating element which reliably has to give information about which state the autonomous driving function (for example, "active" or "inactive" or "driver takeover required") is in for controlled and safe operation of the motor vehicle.

By using the management module, if the bidirectional communication capability is present, it can be queried at the corresponding LED whether a light-emitting operating state is present and thus the functionality of the LED is checked. In this way, each individual LED unit can be deliberately activated and a present status value can be retrieved, wherein the same interface which is used for operating and activating the LED unit is also used for diagnosis. This is enabled in that each LED unit has a separate microcontroller arranged in the housing and is digitally activatable and accordingly does not require activation by using a power supply for this purpose. Due to the bidirectional communication capability, the LED unit capable of lighting can furthermore be used to enable an ability to read back data from the LED unit, which contain items of information about a functionality of the LED unit.

The lighting device is provided for a motor vehicle, for example a passenger vehicle and possibly also a truck. The lighting device preferably has multiple LED units which each comprise a microcontroller and multiple LEDs, which are each integrated in a common housing of the respective LED unit. A single LED unit thus implements a semiconductor component or a system-in-package which, due to the internal microcontroller, can also be referred to as an "intelligent" LED.

The respective LED unit is preferably connected to an internal data bus (i.e., a data bus within the lighting device), which is in turn coupled to the processing module. Signals can be received, processed, and transmitted by the processing module. Such signals comprise, for example, external control commands from a motor vehicle data bus, which are converted by the processing module into internal control commands and can be given on the internal data bus to set the brightness and the color coordinates of one or more LED units. The internal data bus can be, for example, an SPI data bus (SPI="serial peripheral interface") or possibly also another data bus, for example, a differential data bus which codes digital data via a voltage difference between two lines. The motor vehicle data bus can be, for example, a LIN bus (LIN="local interconnect network") or a CAN bus (CAN="controller area network").

The one or more LED units are each settable with respect to their brightness (i.e., light intensity) and emit light having specified color coordinates. The concept of the color coordinates describes a color of the emitted light and can be implemented as monochromatic or as a mixed color which is generated by the respective LED unit. The color coordinates can be specified, for example, as coordinates in a color diagram, in particular in a color diagram of the CIE standard valence system (CIE="commission internationale de l'eclairage").

For example, an LED unit can have multiple LEDs which each emit blue light or light of different colors or wavelengths. In the latter case, the LED unit implements a multicolor LED unit having settable color coordinates. A respective LED unit preferably has, as a single semiconductor component or a system-in-package, at least three monochromatic LEDs of different colors, which are housed together with the microcontroller of the LED unit in a common housing of the semiconductor component. The structure of such a semiconductor component enables a specified light emission based on the electronic semiconductor properties and can additionally be used to ascertain a status value of the respective LED unit, which can be provided to the processing module and/or the microcontroller. Such an ascertainment of a status value of an LED or an LED unit can be carried out both during a light emitting operation and also independently thereof.

The described lighting device thus has a large number of functions which are each integrated into a semiconductor housing of an LED unit, so that required cabling or wiring of the LED unit with the processing module can be reduced and the processing module can be embodied smaller as an activation controller. In this way, a space-saving structure of the lighting device can be implemented which can have an advantageous effect on possible installation positions in or on a motor vehicle. Such an installation space advantage is present in particular in a lighting device having a high number of LED units.

According to one refinement of the lighting device, the microcontroller and the processing module are designed to communicate bidirectionally with one another. The processing module is in particular configured to communicate by signaling with the LED unit or with the microcontroller and to ascertain a present status value. Such a communication comprises receiving and transmitting data and can take place directly between the respective components capable of communication.

According to one refinement of the lighting device, the LED unit is designed as a multicolor LED unit and the LEDs are each designed as monochromatic LEDs. According to a further refinement of the lighting device, the LED unit comprises an RGB LED unit and/or an RGBW LED unit. An RGB LED unit comprises a red, a green, and a blue monochromatic LED in a way known per se and an RGBW comprises, in addition to a red, a green, and a blue LED, also a white light LED.

According to a further aspect of the invention, a lighting system for a motor vehicle comprises at least one embodiment of the above-described lighting device and the motor vehicle. The lighting device is arranged and installed in particular in or on the motor vehicle and forms an interior light and/or an exterior light. The motor vehicle can also have multiple embodiments of the described lighting device, of which, for example, one is arranged in and a further one is arranged on the motor vehicle and implements a corresponding lighting function. In this way, appealing light effects having a homogeneous appearance can be generated. In addition, the lighting device enables an optional retrieval of a present status value of the respective LED unit even independently of the operating state of the LEDs and a possibly activated lighting function. Since the lighting system comprises at least one embodiment of the above-described lighting device, all features and properties of the lighting device are also disclosed for the lighting system and vice versa.

Exemplary embodiments of the invention are explained in greater detail hereinafter on the basis of the schematic drawings.

DETAILED DESCRIPTION OF THE DRAWINGS

Elements of the same construction or function are identified by the same reference signs throughout the figures. For reasons of comprehensibility, possibly not all illustrated elements are identified with associated reference signs in all figures.

Figure 1:
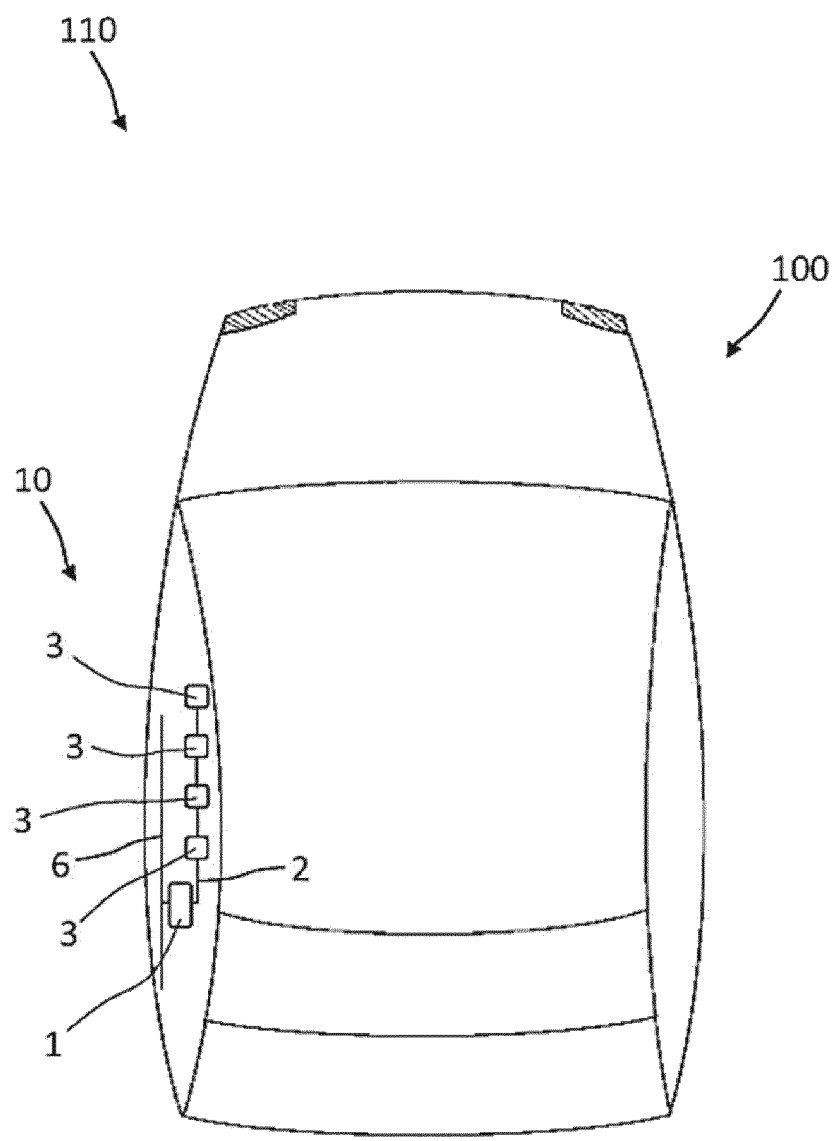
FIG. 1 shows an exemplary embodiment of a lighting system for a motor vehicle in a schematic top view.
Figure 1:
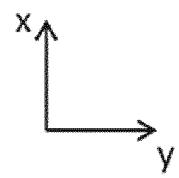

FIG. 1 schematically illustrates a top view of an illumination system 110, which comprises a motor vehicle 100 and an illumination device 10 having a plurality of LED units 3. The LED units 3 are coupled via an internal data bus 2 to form a series circuit, wherein the internal data bus 2 in turn couples the LED units 3 to a processing module 1. The processing module 1 is in turn coupled to a motor vehicle data bus 6.

Figure 2:
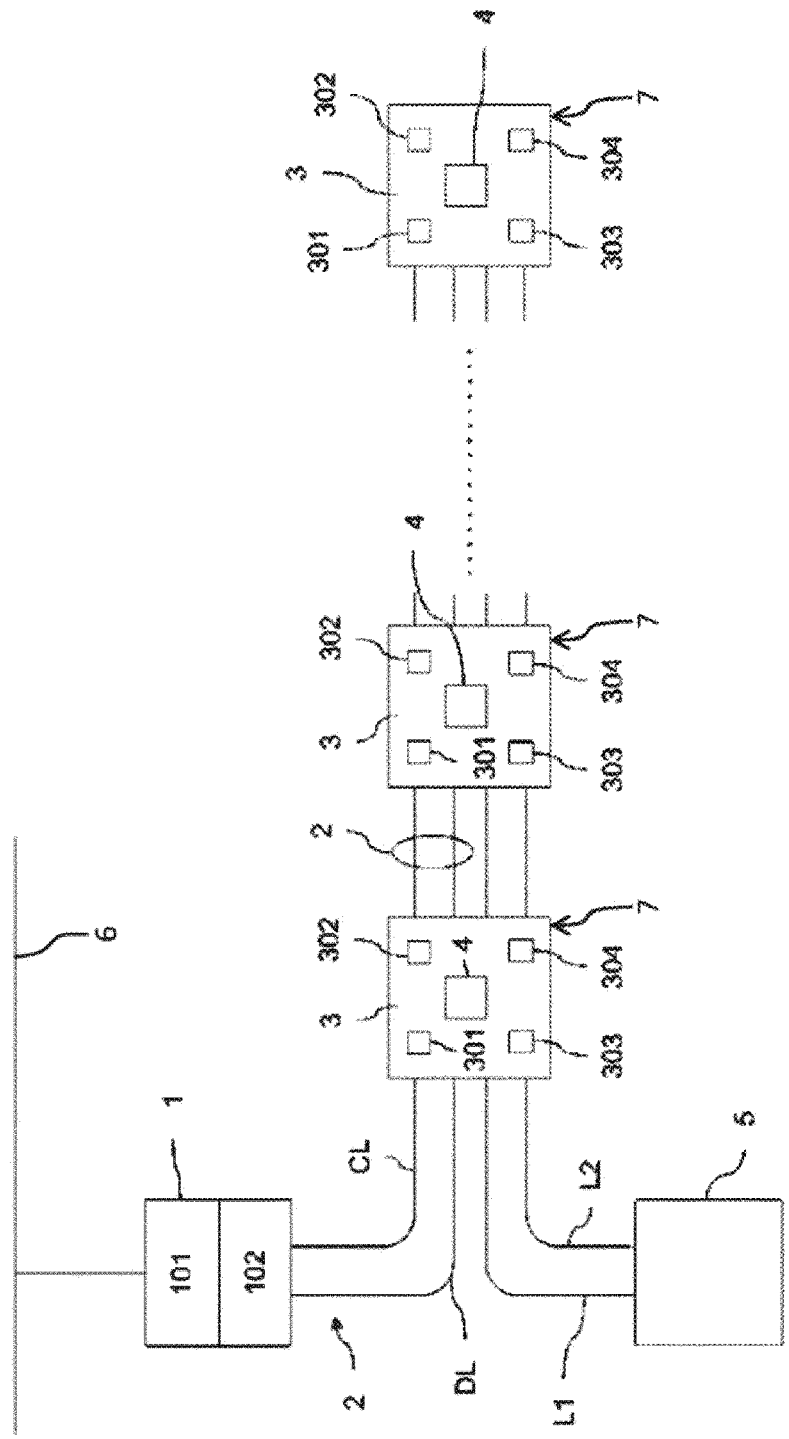
FIG. 2 shows an exemplary embodiment of a lighting device for a motor vehicle in a schematic illustration.
Figure 3:
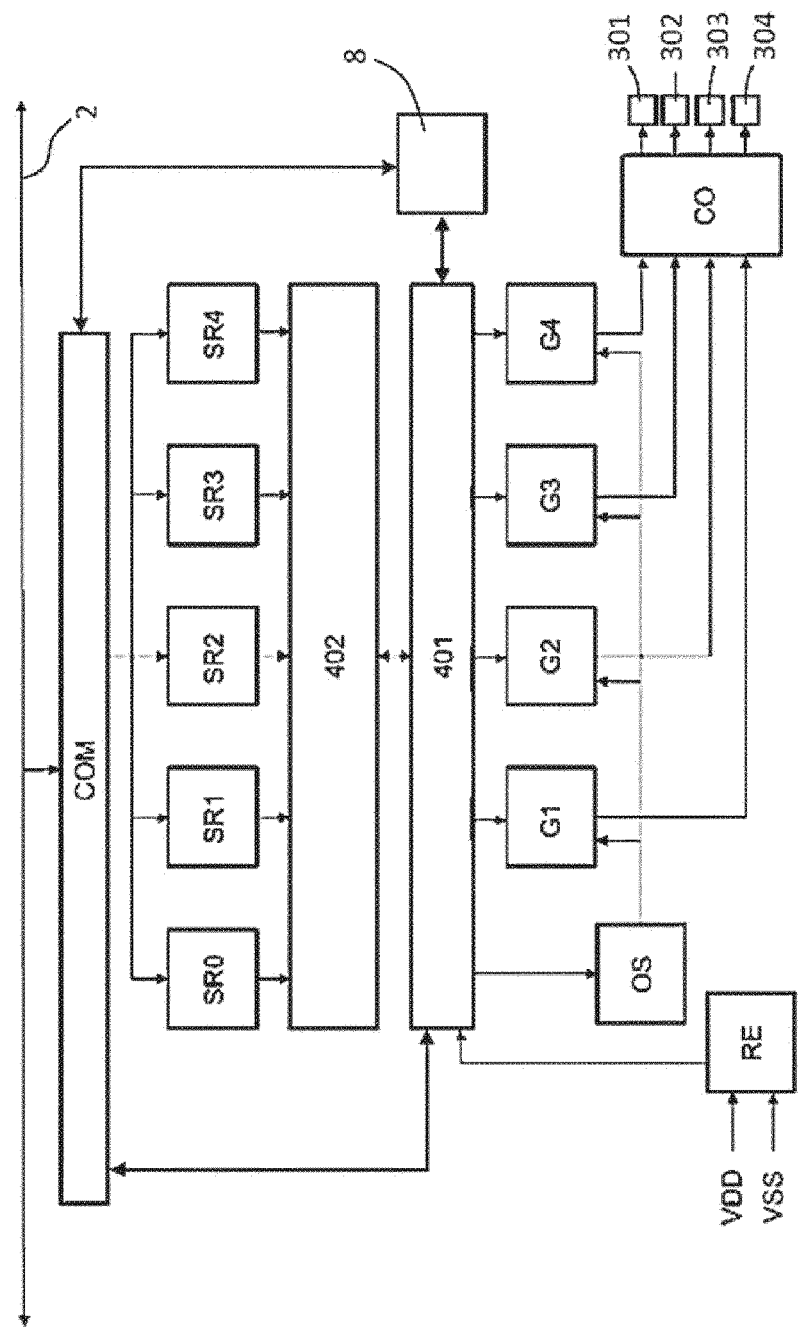
FIG. 3 shows an exemplary embodiment of an LED unit of the lighting device according to FIG. 2 in a detail view.

As explained in greater detail on the basis of following FIGS. 2 and 3, the lighting device 10 or the lighting system 110 enables a space-saving lighting function, for example, to light a section in or on the motor vehicle 100, and additionally an ascertainment of a present brightness value at the location of the respective LED unit 3.

FIG. 2 schematically shows an embodiment of the lighting device 10, which forms an interior light in the vehicle 100, for example, as illustrated in FIG. 1. Alternatively, the lighting device 10 can be arranged as an exterior light on the motor vehicle 100 or the lighting system 110 comprises multiple lighting devices 10 which are installed in and/or on the motor vehicle 100.

The lighting device 10 has as a light source a plurality of multicolor LED units 3 arranged on a band and connected in series. These multicolor LED units 3, which are also referred to hereinafter simply as LED units 3, may each implement a single semiconductor component having multiple monochromatic LEDs 301-304 and a microcontroller 4, which can be implemented as a programmable state machine. The monochromatic LEDs 301-304 and the microcontroller 4 are enclosed by a housing 7 of a respective LED unit 3.

The monochromatic LED 301 is designed, for example, as a red LED, the monochromatic LED 302 as a green LED, the monochromatic LED 303 as a blue LED, and the monochromatic LED 304 as a white LED. The color specifications relate here to the color or the wavelength or the wavelength range of the light emitted by the respective LED. A very high packing density can be achieved using the LED units 3 arranged in the form of a band (depending on the housing shape of, for example, 144 to 367 LEDs/m), so that a space-saving structure is achievable by using the lighting device 10.

The individual LED units 3 are activated via a digital data stream in the form of a bitstream, which is supplied by the internal data bus 2 of the lighting device 10 to the individual LED units 3. The internal data bus 2 comprises in this exemplary embodiment a line CL for the clock and a line DL for the bitstream.

The signals on the internal data bus 2 originate from the processing module 1, which is coupled to the motor vehicle data bus 6 of the motor vehicle 100. The processing module 1 comprises an LIN transceiver 101, which taps corresponding digital signals for activating the LED units 3 from the motor vehicle data bus 6, and also a microcontroller 102, which converts the tapped signals into corresponding data signals on the data line DL of the internal data bus 2. The signals transmitted on the motor vehicle data bus 6 comprise signals which are intended for the lighting device 10 and define a light pattern to be set for the lighting device 10.

The signals in turn originate from a control unit of the motor vehicle 100, which defines the light pattern to be generated, for example, based on an input of the driver and gives it as a corresponding signal to the motor vehicle data bus 6. It is recognized via the processing module 1 whether the light pattern corresponding to the present signal on the motor vehicle data bus 6 is provided for the lighting device. If this is the case, the signal is converted by the microcontroller 102 into a corresponding signal for the internal data bus 2.

The motor vehicle data bus 6 is, for example, a LIN bus (LIN="local interconnect network"). The internal data bus 2 can be, for example, an SPI bus (SPI="serial peripheral interface"), wherein the LED units 3 are connected in a cascade. The signals for the internal data bus 2 are optionally generated here by the microcontroller 102 by SPI software. SPI software represents a program library, using which arbitrary free pins of the microcontroller 102 can be used for signal emission on the SPI bus. Alternatively, however, SPI hardware can also be used. Special SPI pins are provided for signal emission on the SPI bus here.

The internal data bus 2 can also be designed as a differential data bus or as any other data bus as an alternative to an SPI bus. A differential data bus is distinguished in that it codes digital data via a voltage difference between two lines. The LED units 3 can then be interconnected as a daisy chain here.

In the embodiment according to FIG. 2, in addition to the lines CL and DL, two connecting lines L1 and L2 are provided, which are connected to a DC voltage supply 5. Based on the bitstream received via the data line DL, a pulse width modulation (PWM) of the current supplied to the individual LEDs 301-304 takes place, in order to activate the LEDs 301-304 corresponding to the bitstream on the data line DL.

The exemplary structure of a single LED unit 3 according to FIGS. 1 and 2 is illustrated in detail in FIG. 3. The illustrated components of the LED unit 3 are integrated here in a single semiconductor component. The signals of the internal data bus 2 are received via a communication interface COM of the LED unit 3. The clock signal of the clock line CL is relayed to the microcontroller 401 described below, whereas the datastream of the data line DL is given to eight-bit shift registers SR0-SR4 after decoding in the communication interface COM. The value output by the shift register SR0 indicates the desired total brightness of the LED unit 3, whereas the color components of the individual monochromatic LEDs 301-304 for generating the desired mixed color are output via the values of the shift registers SR1 to SR4. In particular, the color component of the red-emitting LED 301 is output via the shift register SR1, the color component of the green-emitting LED 302 via the shift register SR2, the color component of the blue-emitting LED 303 via the shift register 303, and the color component of the white-light-emitting LED 304 via the shift register 304.

The values of the individual shift registers are supplied to the microcontroller 4, which has a logic or a microcontroller 401 and an associated nonvolatile EEPROM memory 402. In particular calibration data can be stored in this memory 402, which originate from a calibration process of the LED unit 3 and define for a predetermined standard temperature value of the LED unit 3 how the operating currents of the individual monochromatic LEDs 301-304 are to be set so that the total brightness value originating from the shift register SR0 and the color mixing (i.e., the color coordinates in this respect) are achieved corresponding to the values from the shift registers SR1 to SR4. The microcontroller 401 makes use of the values stored in the memory 402.

Because of the bidirectional communication capability of the LED unit 3 or the microcontroller 4 with the processing module 1, a present status value of the LED unit 3, which can give information about a functionality of the LED unit 3, can be ascertained progressively, at predetermined time intervals, or upon request on the part of the processing module 1. A respective LED unit 3 can be deliberately activated by the processing module 1 and a present status value can be retrieved.

The operating currents for the individual LEDs 301-304 are provided via a voltage regulator RE, which receives the positive voltage VDD and the negative voltage VSS from the voltage supply 5 shown in FIG. 2. The microcontroller 401 furthermore generates a clock for a corresponding oscillator OS, which is supplied to PWM generators G1-G4. The operating currents of the individual LEDs 301-304 are generated in the generators G1-G4 via pulse width modulation. The values of the operating currents originating from a predetermined algorithm are given by the microcontroller 401 to the individual generators G1-G4. The generator G1 generates by using pulse width modulation the current for the red-emitting LED 301, the generator G2 the current for the green-emitting LED 302, the generator G3 the current for the blue-emitting LED 303, and the generator G4 the current for the white-emitting LED 304. The corresponding light having the desired brightness and the desired color coordinates according to the signal is then set for the LED unit 3 via the PWM signals generated by the individual generators, which arrive at the monochromatic LEDs 301-304 via the current output CO, and the signal arrives at the LED unit 3 via the internal data bus 2.

The microcontroller 102 of the processing module 1 is designed in a corresponding way as was described for the LED unit in FIG. 3, for the purpose of converting the data signal which comprises the activation information for the LED unit 3 into a pulse-width-modulated signal of the current supplied to the individual LEDs 301-304. The microcontroller 102 can thus be designed with respect to the conversion corresponding to the microcontroller 4 of the LED unit. This pulse-width-modulated signal is not output via the internal data bus 2, however, but supplied to an internal comparison unit 103, which can be part of the microcontroller 102 (see FIG. 5). The comparison unit 103 is designed to check whether the pulse-width-modulated signal contains an item of information which corresponds to the activation information for the LED unit 3. This enables hardware faults with respect to a fault of the communication function of the processing module 1 to be checked.

The check as to whether the pulse-width-modulated signal contains an item of information which corresponds to the activation information for the LED unit thus takes place in that the activation information, which comprises the transmitted data signal, is compared to the information contained in the pulse-width-modulated signal. If the activation information and the information contained in the pulse-width-modulated signal correspond, the conversion of the activation information was thus successful, whereby it is ensured that a signal converter unit of the microcontroller 102 of the processing module operates correctly. If the activation information and the information contained in the pulse-width-modulated signal do not correspond, in contrast, a fault of the signal converter unit of the processing module thus exists.

The microcontroller of the processing module, the structure of which corresponds to the microcontroller 4 of the LED unit 3, is expediently used as the signal converter. In this way, the signal conversion can be provided in a cost-effective and simple manner, since an ASIC can be used which is already used for the LED unit 3.

Figure 4:
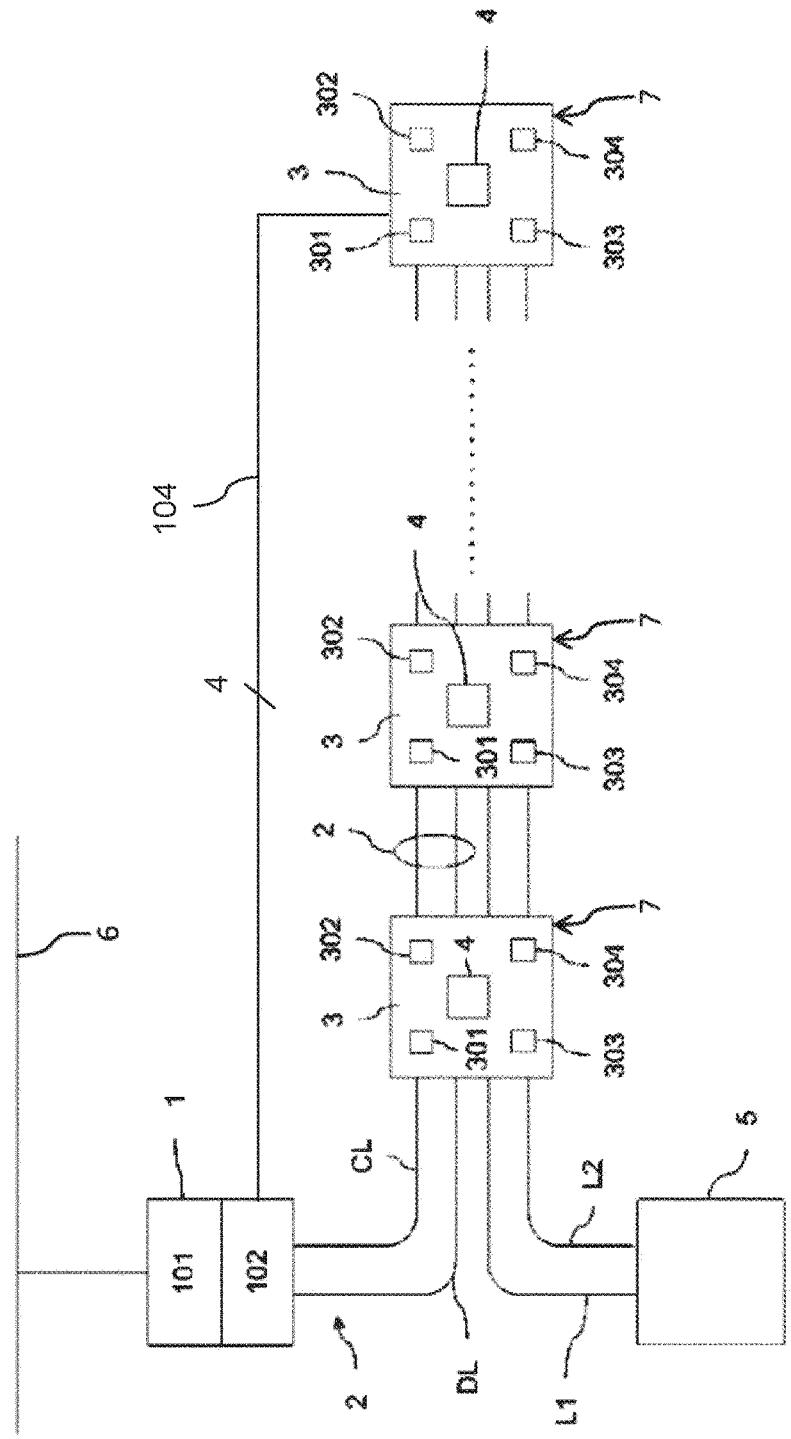
FIG. 4 shows an exemplary embodiment of a lighting device for a motor vehicle in a schematic illustration, which enables the checking of the functionality of the communication components of a processing module and all LED units.

Moreover, as shown in FIG. 4 according to one preferred variant, a return of the pulse-width-modulated signal generated by the last LED unit 3 of the series circuit is performed and it can be supplied to the comparison unit 103 of the processing module 1 for comparison to the activation information. If the activation information and the information contained in the pulse-width-modulated signal correspond, not only was the conversion of the activation information in the processing module successful, but each communication interface COM of the LED units 3 arranged between the processing module 1 and the last LED unit 3 has correctly processed and relayed the activation information. If the activation information and the information contained in the pulse-width-modulated signal do not correspond, in contrast, a fault thus exists in the communication interface COM of one of the LED units 3.

In order to be able to supply the pulse-width-modulated signal generated by the last LED unit 3 of the series circuit to the comparison unit 103 of the processing module 1, they are connected to one another via a number of lines 104, wherein the number of the lines 104 corresponds to the number of the LEDs 301 to 304.

Although the return of the pulse-width-modulated signal generated by the last LED unit 3 of the series circuit to the comparison unit represents the preferred variant, the return can also take place from one or more arbitrary other LED units 3.

Figure 5:
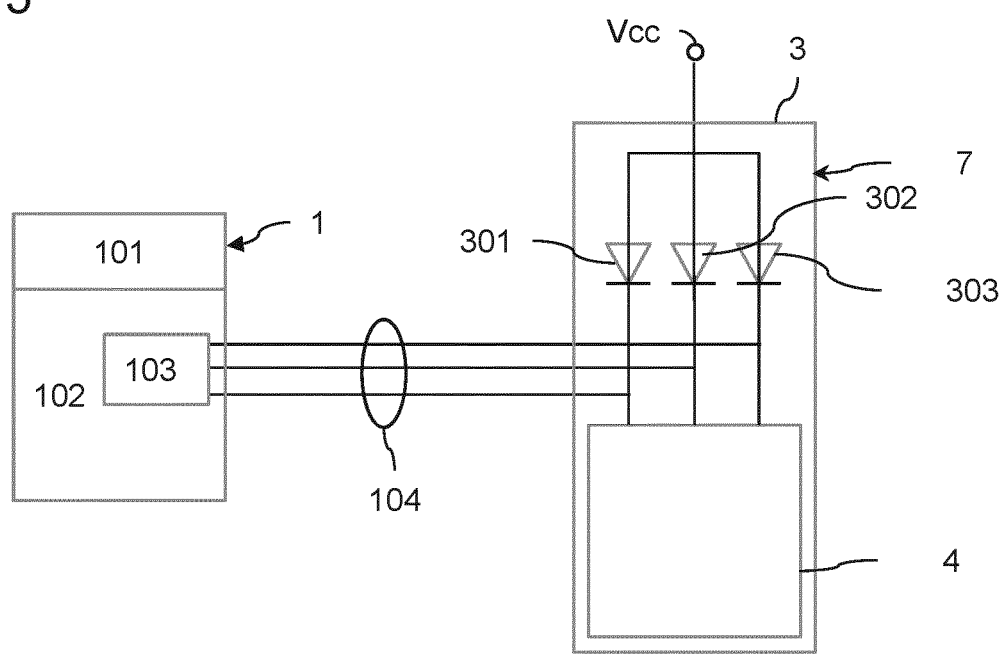
FIG. 5 shows an exemplary embodiment which illustrates the return of a pulse-width-modulated signal to the processing module for further evaluation.

FIG. 5 shows a more detailed illustration of the return of the pulse-width-modulated signal generated by the LED units 3 to the processing module 1 for further evaluation. Only three of the LEDs 301-303 are illustrated as examples, which are connected between a supply potential terminal and the microcontroller 4. A current resulting from the pulse-width-modulated signal flows in each of the lines in which the LEDs 301-303 are located, as described above. The corresponding pulse-width-modulated signals are supplied via the lines 104 to the comparison unit 103 of the processing module 1 and evaluated there as to whether the information contained therein corresponds to the activation information, which is output by the processing module 1 via the internal data bus 2 to the LED units 3.

As a result, in this way a secured end-to-end communication can be provided between the processing module 1 and the LED units 3.

LIST OF REFERENCE SIGNS 1 processing module
10 lighting device
100 motor vehicle
101 LIN transceiver
102 microcontroller
103 comparison unit
104 line
110 lighting system
2 internal data bus
3 multicolor LED unit
301-304 monochromatic LEDs
4 microcontroller
401 microcontroller
402 EEPROM
5 voltage supply
6 motor vehicle data bus
7 housing of the LED unit
CL line for clock signal
CO current output
COM communication interface
DL data line
G1-G4 PWM generators
L1-L2 connecting lines
OS oscillator RE voltage regulator
SR0-SR4 shift register
VDD, VSS voltages

What is claimed is:

1. A lighting device for a motor vehicle, the lighting device comprising:
   an LED unit comprising a first microcontroller and a plurality of LEDs, wherein the first microcontroller and the plurality of LEDs are enclosed by a housing of the LED unit, and the LED unit is configured to emit light having settable brightness and specified color coordinates in an operational state; and
   a processing module that is configured to receive and process a signal from a data bus of the motor vehicle, to transmit a data signal, to convert the data signal, which comprises an item of activation information for the LED unit, into a pulse-width-modulated signal of the current supplied to the plurality of LEDs, and to check whether the pulse-width-modulated signal contains an item of information which corresponds to the activation information for the LED unit.

2. The lighting device according to claim 1, wherein the processing module comprises a second microcontroller, and a structure of the second microcontroller corresponds to the first microcontroller of the LED unit.

3. The lighting device according to claim 1, wherein
   the LED unit is further configured to convert the activation information into a pulse-width-modulated signal of the current supplied to the plurality of LEDs and to supply the pulse-width-modulated signal to the processing module to check whether the pulse-width-modulated signal generated by the LED unit contains an item of information which corresponds to the activation information.

4. The lighting device according to claim 3, wherein
   the pulse-width-modulated signal generated by the LED unit of the current supplied to the plurality of LEDs is supplied via respective connecting lines to the processing module.

5. The lighting device according to claim 1, wherein the lighting device comprises a plurality of LED units which are coupled via an internal data bus in a series circuit, and one of the LED units of the series circuit is configured to convert the activation information into a pulse-width-modulated signal of the current supplied to the plurality of LEDs and to supply the pulse-width-modulated signal to the processing module for checking.

6. The lighting device according to claim 5, wherein the plurality of LED units are coupled according to a daisy chain principle.

7. The lighting device according to claim 5, wherein the LED unit of the series circuit which has the greatest distance to the processing module is configured to convert the activation information into the pulse-width-modulated signal of the current supplied to the plurality of LEDs and to supply the pulse-width-modulated signal to the processing module for checking.

8. The lighting device according to claim 1, wherein the LED unit is further configured to communicate bidirectionally with the processing module, so that a present status value of the LED unit, which is representative of a functionality of the LED unit, is ascertainable by the LED unit and the processing module.

9. The lighting device according to claim 8, wherein the microcontroller of the LED unit and the processing module are designed to communicate bidirectionally with one another.

10. The lighting device according to claim 1, wherein the LED unit is a multicolor LED unit and each LED of the plurality of LEDs is monochromatic.

11. The lighting device according to claim 1, wherein the LED unit comprises at least one of an RGB LED unit or an RGBW LED unit.

12. A lighting system for a motor vehicle, the lighting system comprising at least one lighting device according to claim 1.

13. The lighting system according to claim 12, wherein the lighting device is arranged in the motor vehicle and is configured as an interior light.

14. The lighting system according to claim 12, wherein the lighting device is arranged on an outside of the motor vehicle and is configured as an exterior light.

* * * * *